O. NELSON & P. WIGGEN.
SPEED REGULATING MECHANISM FOR MUSICAL INSTRUMENTS.
APPLICATION FILED JUNE 6, 1914.

1,201,609.

Patented Oct. 17, 1916.
5 SHEETS—SHEET 3.

WITNESSES
H. P. Palmer.
A. S. Phillips.

INVENTORS.
Oscar Nelson &
Peder Wiggen,
BY Chas. A. Tillman
ATTY

O. NELSON & P. WIGGEN.
SPEED REGULATING MECHANISM FOR MUSICAL INSTRUMENTS.
APPLICATION FILED JUNE 6, 1914.

1,201,609.

Patented Oct. 17, 1916.
5 SHEETS—SHEET 4.

INVENTORS
Oscar Nelson &
Peder Wiggen,
BY Chas. C. Tillman
ATTY.

WITNESSES
H. P. Palmer
A. S. Phillips

UNITED STATES PATENT OFFICE.

OSCAR NELSON AND PEDER WIGGEN, OF CHICAGO, ILLINOIS, ASSIGNORS TO J. P. SEEBURG PIANO COMPANY, OF CHICAGO, ILLINOIS, A CORPORATION OF ILLINOIS.

SPEED-REGULATING MECHANISM FOR MUSICAL INSTRUMENTS.

1,201,609.  Specification of Letters Patent.  Patented Oct. 17, 1916.

Application filed June 6, 1914. Serial No. 843,366.

*To all whom it may concern:*

Be it known that we, OSCAR NELSON and PEDER WIGGEN, citizens of the United States, residing at the city of Chicago, in the county of Cook and State of Illinois, have invented certain new and useful Improvements in Speed-Regulating Mechanism for Musical Instruments, of which the following is a specification.

This invention relates to improvements in a mechanism to be used in connection with self-playing musical instruments, and especially pianos, for regulating the speed of the winding and rewinding reels or spools which carry the perforated music sheet over the tracker-bar, and it consists in certain peculiarities of the construction, novel arrangement and operation of the various parts thereof as will be hereinafter more fully set forth and specifically claimed.

The principal object of the invention is to provide a variable speed mechanism of the above named general character which shall be of such construction and have such combination and arrangement of its parts, that the movement of the perforated music sheet over the tracker-bar can be readily increased or diminished while being wound on the "take-up" spool, or quickly rewound therefrom on the supply or rewinding spool, without necessitating any change in the speed or direction of rotation of the power or motor-driven shaft, thereby affording means for the quick repetition of a certain piece of music or tune, or if desired, for quickly placing a certain selection or part of the sheet, in position to be played, whether said selection is wound on the supply spool or shall have been wound on the "take-up" spool.

Another object is to furnish means for automatically rewinding the music sheet after the end of the music thereon has been reached, or if desired, for manually throwing the rewinding mechanism into action at any point between the ends of the sheet.

A further object is to provide a mechanism of such construction and arrangement of its parts, that it can be conveniently located and supported within the piano or instrument casing, usually above the keyboard and at one end of the music-sheet rolls or spools, where it can be readily reached for adjustment of its parts when required.

Other objects and advantages of the invention will be disclosed in the subjoined description and explanation.

In the accompanying drawings, which serve to illustrate the invention

Like numerals of reference refer to corresponding parts throughout different views of the drawings.

The mechanism includes a frame, which consists of a base 15, having at one of its ends an upright 16, and near its other end an upright 17, and said base may be provided with depending legs or blocks 18, to rest on a horizontal shelf or support 19, within the piano casing. Firmly secured to the inner surface of the upright 16, and extended upwardly from the base 15, is a rectangular frame 20, which has extended upwardly from about the middle of its lower portion an upright 21, in which upright and one side of the frame 20 is journaled a stub shaft 22, which has mounted on its outer end a beveled gear 23, to mesh with another beveled gear 24 mounted on the lower portion of the vertical shaft 25, which is journaled at its upper and lower ends in inwardly and horizontally projected extensions 26 of a hanger 27, which is vertically located adjacent to and pivotally secured by means of a pivot 28 to the outer portion of the frame 20, which is normally pressed rearwardly by means of a spring 29 longitudinally secured to said frame, but having its free portion extended in front and in contact with the upper extension or arm 26 of the pivoted hanger. Horizontally mounted on the shaft 25 is a friction roller 30, which is adapted to be thrown into and out of contact with a frictional driving disk or wheel 31, which is mounted on a power shaft 32, journaled in a suitable bracket or support 33, extended rearwardly from the frame 20, to which frame said bracket is by preference firmly secured. The power or driving shaft 32 has on its rear portion a sprocket wheel or pulley 34, which may be geared by means of a sprocket chain or belt 35 to a motor or other source of power used for driving the mechanism.

Figure 1:
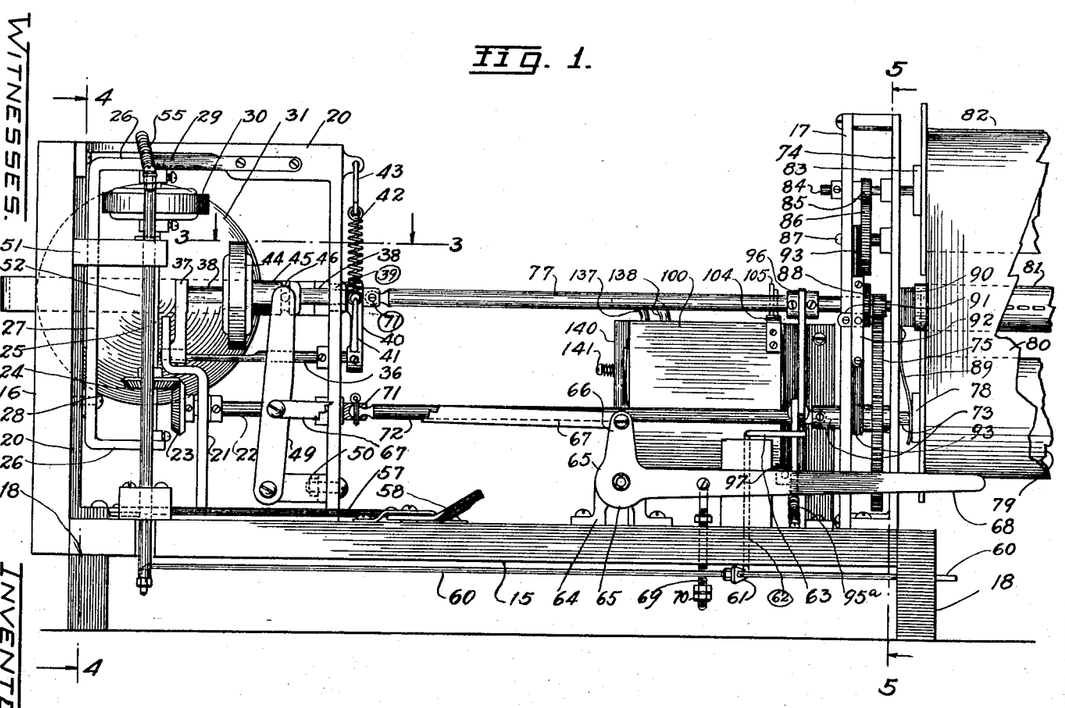
Figure 1 is a front face view of the complete mechanism, showing its parts arranged to afford the ordinary movement of the perforated sheet of music and illustrating fragments of the sheet carrying spools, tracker-bar and said sheet.

As is clearly shown in Fig. 1, the upper portion of the upright 21 is provided with an off-set, and has journaled thereon just above said off-set a rock shaft 36, the other end of which is journaled on the inner upright portion of the frame 20 at about the middle thereof. Rigidly fixed at its lower end on the outer end of the rock-shaft 36 is an upwardly extended arm 37, in which one end of a shaft 38 is journaled, the other end of said shaft being extended through an enlarged opening 39 in the inner upright portion of the frame 20 above the rock shaft, and journaled on the upper end of an arm 40, which is rigidly fixed at its lower end to the inner end of the last named shaft. Extended forwardly from the lower portion of the arm 40 is an arm 41, which is connected to the upper portion of the frame 20, by means of a spring 42, and a link 43, which spring is used to normally force the upper portion of the arm 40 and the shaft 38 thereon toward the friction disk 31, which, as shown in the different views of the drawings, is located in a vertical plane rearwardly of the frame 20 and the pivoted hanger 27, which carries the vertical shaft 25, as previously explained. Slidably mounted on the shaft 38, but so as to rotate therewith is a friction roller 44, the hub 45 of which is provided with a groove 46 to receive pins 47 projected inwardly from the prongs 48 of a link 49, which is pivotally connected at its lower end to a projection 50 on the lower portion of the frame 20, the said prongs forming a yoke for the hub of said friction roller. Vertically journaled on the base 15 and on a horizontally extended bracket 51, on the upper portion of the upright 16 of the main frame is a shaft 52, which extends through the base on said bracket, and has on its upper end a crank 53 to which is pivotally connected one end of a link 54, the other end of which is similarly connected to the upper front portion of the arm 26 of the frame 27, just in front of the shaft 25, which is journaled in said arm. Connected at one of its ends to the pivot of the crank 53 is a spring 55, which is connected at its other end to the upper portion of the frame 20 and is employed for holding the friction roller 30 in contact with the friction disk 31 when the parts are turned to the position shown in Fig. 10 of the drawings. Just above the base 15 the shaft 52 is provided with another crank arm 56 which has pivotally connected thereto at one of its ends a rod 57 which is pivotally connected at its other end to a lever 58 fulcrumed on the upper surface of the base 15 near its middle. This lever, connecting rod and crank arm 56 are employed to turn the shaft 52 so as to throw the friction roller 30 into or out of contact with the friction disk. Below the base 15 the shaft 52 is provided with another crank arm 59 to which is pivotally secured at one of its ends the rod 60 which is extended longitudinally beneath the base 15 and may pass through a suitable opening in one of the blocks or projections 18 of the base, which will serve in supporting said rod at said end.

The crank arms 53 and 59 at the upper and lower ends respectively of the shaft 52 are extended in opposite directions, but in substantially the same plane, and the crank arm 56 is projected from the shaft 52 at an angle to said crank arms so that by moving the lever 58 in the proper direction to cause the roller 30 to contact with the friction disk 31 or to remove said roller from said disk, the link 54 will actuate the frame 27 on its pivot 28 and the rod 60, which is loosely connected to a crank arm 61 on the lower end of a shaft 62, which is vertically journaled in the base 15, and has at its upper end an arm 63, to turn, for the purpose to be presently explained. Fulcrumed on the bracket 64 on the upper surface of the base is a bell crank lever 65, the short arm 66 of which is pivotally connected by means of a bar 67 to the link 49 which engages the hub of the roller 44, by means of the yoke and pins on said link. The longer arm 68 of the bell crank lever 65 is extended along the front portion of the mechanism where it can be easily reached for operation, and if desired, may be exposed through the casing of the instrument. By moving the arm 68 of the bell crank lever in the proper direction, it is evident that the roller 44 will be slid on the shaft 38 either toward the center of the disk 31, so as to decrease the movement of the shaft, which said roller drives, or outwardly toward the periphery of the friction disk so as to increase the movement of said shaft. Pivotally secured at its upper end to the arm 68 of the bell crank lever is a screw bolt 69, which is extended through a suitable opening in the base 15 and has on its upper and lower portions nuts 70 which can be suitably adjusted to limit the movement of the bell crank lever. Loosely connected to the inner end of the shaft 22 by means of a knuckle or ball joint 71 is a shaft 72 which is by preference similarly connected at its other end to a stub shaft 73 horizontally journaled in the upright 17 and the lower portion of an upright 74, which forms a part of the frame used for supporting the spools for the music sheet and the tracker-bar, and which latter upright is located in parallelism with the upright 17, yet at a distance therefrom. Mounted on the shaft 73 between the uprights 17 and 74 is a gear 75, which meshes with a pinion 76, mounted on a shaft 77 near one of its ends, which shaft is extended through a vertically elongated opening 78 (see Fig. 11) in the upright 17, but terminates short of the upright 74, thus permitting vertical movement of the shaft 77 at said end, which shaft has its other end connected to the inner end of the shaft 38 by means of the knuckle or ball joint 71 of similar construction to the joint which connects the shaft 72 to the shaft 22. The stub shaft 73 extends through the upright 74 and may have its outer end formed angularly in cross section to fit within a correspondingly shaped socket in the flange head 78 of the "take-up" spool 79 for the perforated music sheet 80, which extends from the spool 79 over the tracker-bar 81 to the supply or rewinding spool 82, the flange head 83 of which is rigidly mounted on a stub shaft 84 horizontally journaled in the uprights 17 and 74 above the shaft 77, and has mounted thereon a pinion 85 which meshes with a larger pinion 86 mounted on a shaft 87 journaled on the uprights 17 and 74 between the shafts 77 and 84. The shaft 77 has mounted thereon adjacent to its pinion 76 a pinion 88 adapted to be thrown into mesh with the pinion 86 when the shaft 77 is moved upwardly, as will be presently explained, for the purpose of rewinding the music sheet 80, which is provided with perforations as usual. A flat spring 89 secured at one of its ends to the upright 74 and resting against the flange head 78 of the "take-up" spool 79 may be employed for pressing said spool in order to cause its heads or flanges to aline properly with the flanges of the spool 82, so that the music sheet will be properly wound on one of said spools and unwound from the other. The upright 74 is provided on its surface opposite the above mentioned gears with a bracket 90 for the support of one end of the tracker-bar 81, the other end of which may be supported in the ordinary or any well known manner. Secured to a bracket 91 on the front surface of the upright 17 at about its middle is a plate 92, which carries at each of its ends a spring 93, one of which rests against the hub of the pinion 86 and the other against the hub of the gear 75, for the purpose of creating friction thereon.

Figure 5:
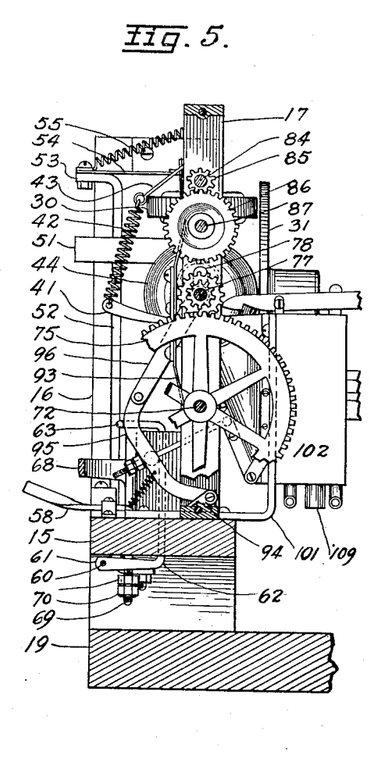
Fig. 5 is a cross sectional view taken on line 5—5 of Fig. 1, looking in the direction indicated by the arrows, but showing the location of the vertically movable gears in about the position they will occupy when the same are neutral and parts of the mechanism are arranged for more rapidly winding the music-sheet on the "take-up" spool than when said parts are in the positions shown in Figs. 1 and 2.
Figures 6, 7, 8, 9, 12:
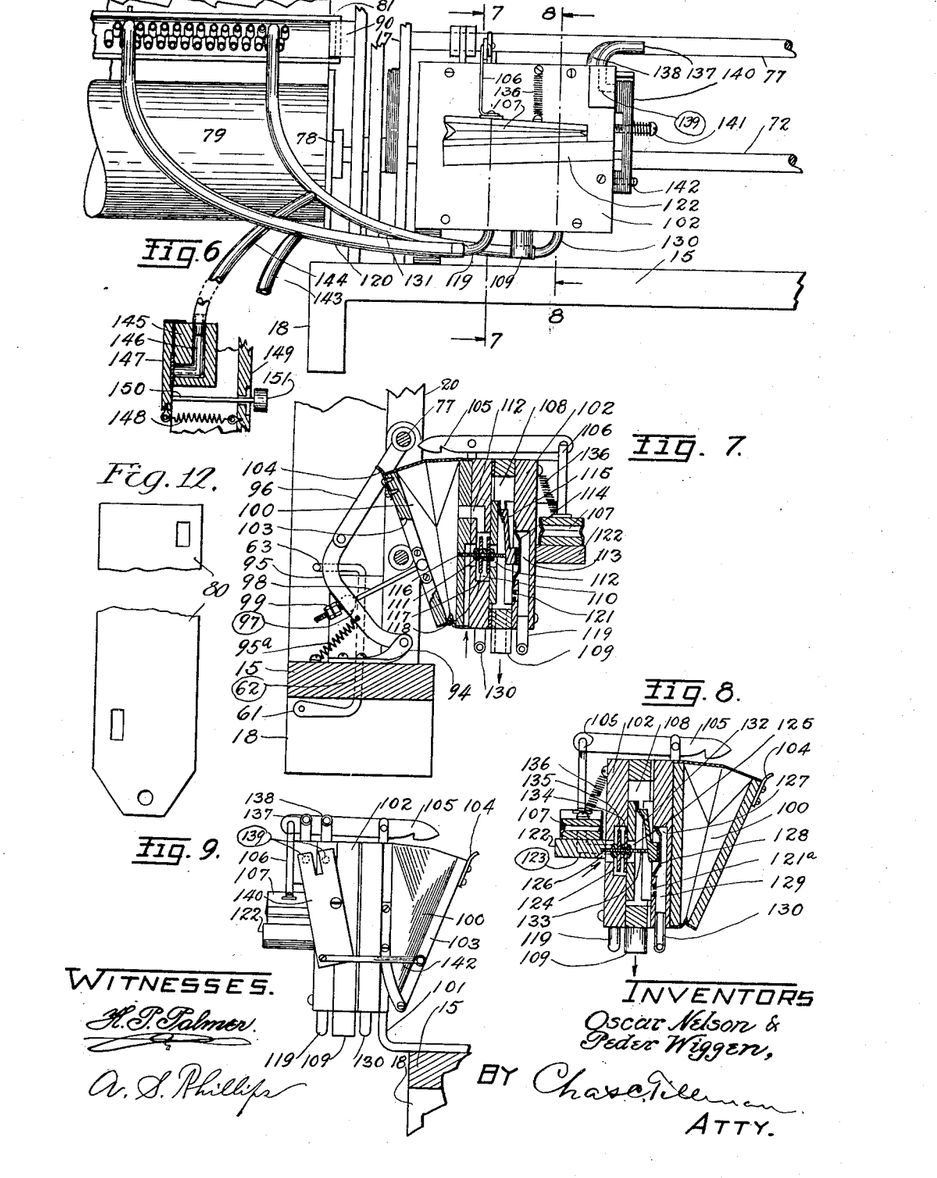
Fig. 6 is a rear face view of a portion of the mechanism showing a part of the tracker-bar and a portion of the "take-up" spool illustrating the pneumatics and connecting means for throwing the mechanism into and out of rewinding operation.
Fig. 7 is a cross sectional view taken on line 7—7 of Fig. 6, looking in the direction indicated by the arrows.
Fig. 8 is a similar view taken on line 8—8 of Fig. 6, looking in the direction indicated by the arrows.
Fig. 9 is an end elevation of the pneumatics, looking from the portion thereof adjacent to the driving disk.
Fig. 12 is a view of the music sheet showing it shortened and reduced for the convenience of illustration and illustrating the slots or openings to coöperate with the openings of the tracker bar, but with the note openings omitted.

Referring now more particularly to Figs. 5 and 7 of the drawings, it will be seen that the base 15 is provided on its upper surface near the upright 17 with a bracket 94 to which is pivotally secured one end of a link 95, the other end of which is pivotally connected to the lower end of another link 96, which is loosely connected at its upper end to the shaft 77 which, as before stated, is movable vertically in the opening 78 of the upright 17.

Figures 2, 3:
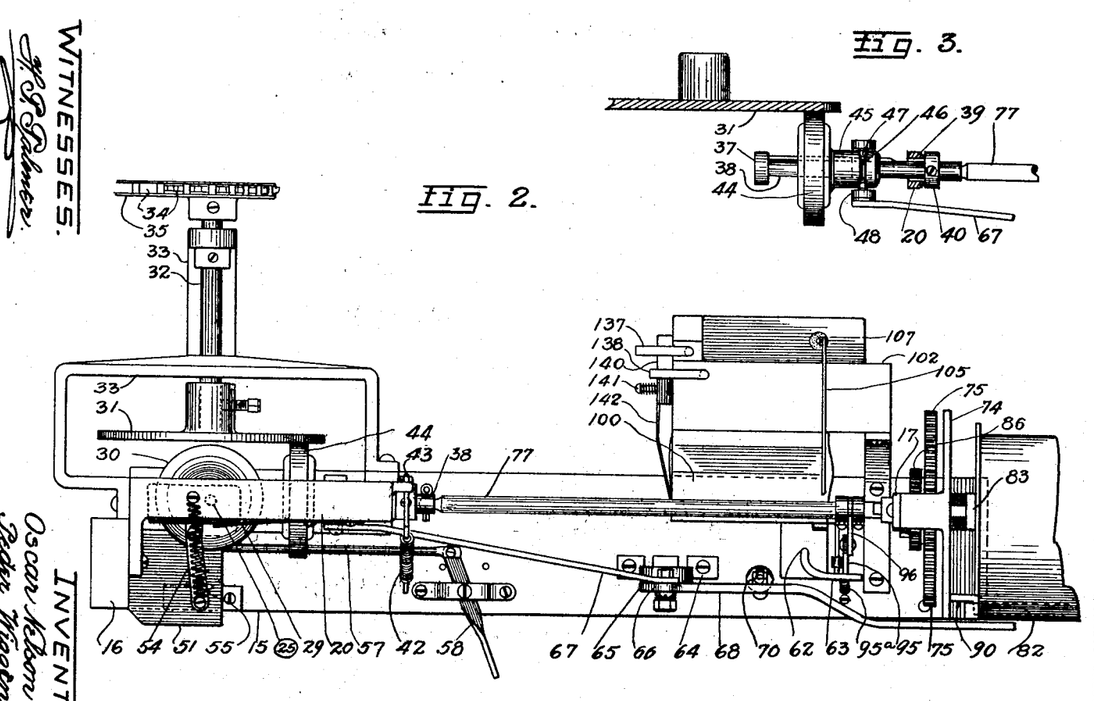
Fig. 2 is a plan view thereof.
Fig. 3 is a plan sectional view taken on line 3—3 of Fig. 1, showing a portion of the frictional driving-disk and one of the friction rollers which co-acts therewith, illustrating the means for moving said rollers back and forth on its shaft.
Figure 4:
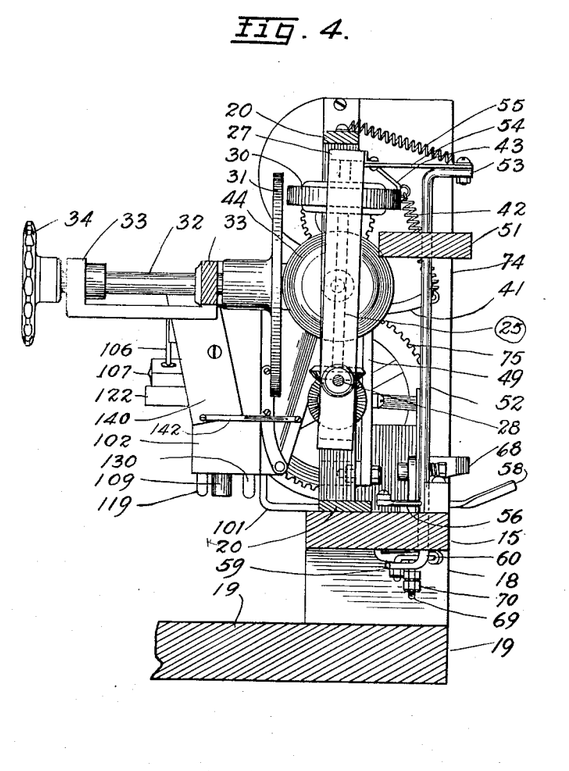
Fig. 4 is a vertical cross sectional view taken on line 4—4 of Fig. 1 looking in the direction indicated by the arrows, showing the parts in the same position as indicated in Figs. 1 and 2 of the drawings.
Figures 10, 11:
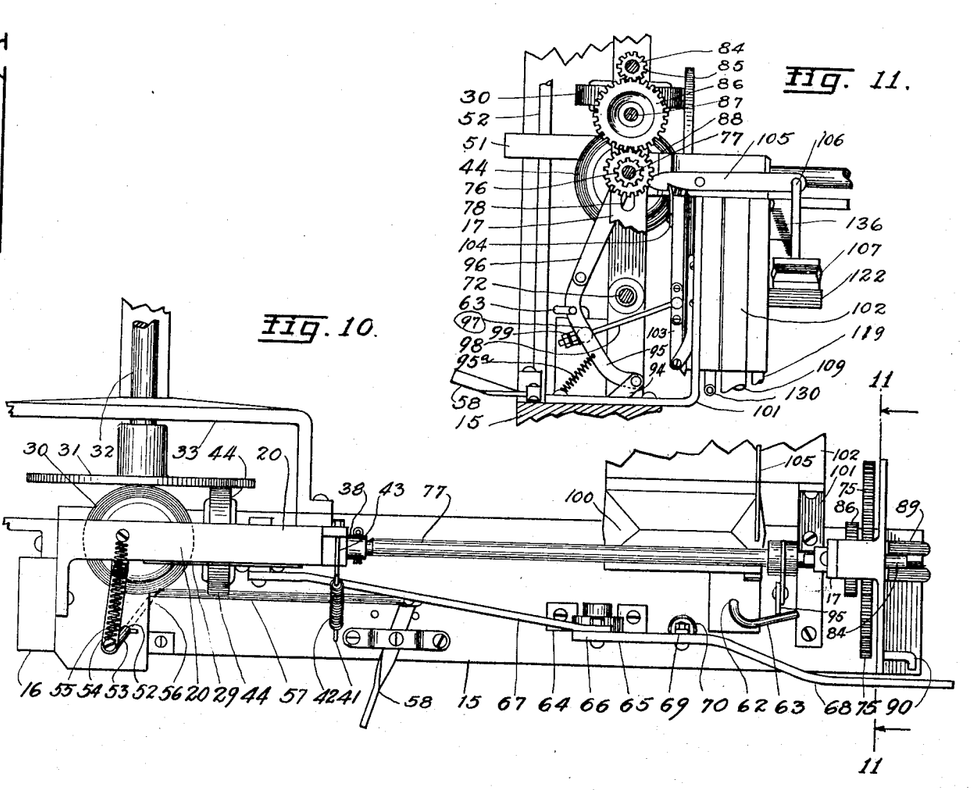
Fig. 10 is a fragmental plan view showing the parts in about the positions they will assume when adapted to drive the "take-up" spool at its highest rate of speed.
Fig. 11 is a fragmental view partly in section and partly in elevation taken on line 11—11 of Fig. 10, looking in the direction indicated by the arrows, showing the position the vertically movable gears will occupy when the pneumatic for controlling the rewinding spool is collapsed and the rewinding mechanism is in operation.

By reference to Figs. 1, 2, 5 and 7 of the drawings, it will be seen that the arm 63 of the shaft 62 projects in front of the link 95, so that when the lever 58 is thrown from the position shown in Figs. 1 and 2 to that illustrated in Fig. 10, the rod 60 connected to the crank arm 59 on the vertical shaft 52 will be moved toward the spools, in which operation the shaft 62 will be turned by reason of its connection through the arm 61 with the rod 60, thereby causing the arm 63 to force the links 95 and 96 rearwardly, thus causing the end of the shaft 77, having the pinions 76 and 88 thereon to be raised and the first named pinion disengaged from the gear 75, thus leaving said pinions in about the positions shown in Fig. 5 of the drawings. The link 95 has on its surface adjacent to the shaft 62 an apertured lug 97 through which aperture is loosely extended a screw bolt 98 having on its lower portion nuts 99 to adjust its movement with respect to the link 95, and pivotally secure it at its upper end to the front portion of a pneumatic 100 which controls the rewinding mechanism. The link 95 has connected thereto one end of a spring 95ª, the other end of which is connected to the base 15 and normally holds the jointed connection, consisting of the links 95 and 96, in their retracted positions or that position shown in Figs. 1, 5 and 7 of the drawings.

Mounted on a suitable bracket 101, extended rearwardly and upwardly from the base 15, near the upright 17, is a pneumatic valve chest 102, which carries on its front portion a pneumatic 100 of the bellows type. The front plate 103 of the pneumatic is hinged at its lower portion to the lower front portion of the chest 102 and has at its upper portion a projection 104 to engage a catch lever 105 which is transversely fulcrumed on the chest and has its rear end extended rearwardly of said chest, and connected by means of a rod 106 to the upper portion of a horizontally disposed pneumatic 107 mounted on the rear portion of the valve chest.

As is clearly shown in Figs. 7 and 8 of the drawings, the valve chest 102 is provided with a chamber 108, from which air is continually exhausted through a pipe 109, to which a tube may be connected leading to an exhaust pneumatic of the ordinary or well known construction (not shown). The front wall of the valve chest has near one of its ends a valve chamber 110, which communicates through a port 111, with the atmosphere, and through a port 112 with the chamber 108. The valve chamber 110 also has communication through a port 112 with the interior of the pneumatic 100, as is clearly shown in Fig. 7 of the drawings. Directly rearwardly of the port 112 the rear wall of the valve chest is provided with a chamber 113, which is covered by a flexible diaphragm 114, against which rests one end of a bar 115, which is hinged at its upper end to the front wall of the chest above the chamber 110. Secured to the bar 115 is a stem 116 which carries a pair of valves 117 and 118, which are located within the chamber 110, the former being adapted to close the port 112, and the latter the port 111. Communicating with the chamber 113 is a tube 119 to which a tube or hose 120 is connected at one of its ends, which tube or hose is connected at its other end to one of the nipples of the tracker-bar, as is clearly shown in Fig. 6 of the drawings. Just below the diaphragm 114, a bleed opening 121 is provided which furnishes a small passageway between the chamber 108 and the channel or chamber 113 for the passage of air. A shelf 122, which supports the pneumatic 107 on the rear portion of the valve chest is provided with a port 123, which communicates with said pneumatic and also with a valve chamber 124 provided in the rear wall of the valve chest near its end opposite that end in which the valve chamber 110 is formed. The valve chamber 124 has communication through a port 125 with the chamber 108, and also with the atmosphere through a port 126 in the rear wall of the chest and just below the shelf 122 thereon. Directly in front of the port 125 the front wall of the chest is provided with a chamber 127 which is covered by a diaphragm 128 and has communication through a channel 129 with a tube 130 to which is connected the flexible tube or hose 131 which communicates at its end with one of the nipples of the tracker-bar, as is clearly shown in Fig. 6 of the drawings.

Hinged at its upper end to the wall of the chest above the port 125 is a bar 132, the lower portion of which rests against the diaphragm 128 and carries a stem 133 on which is mounted a pair of valves 134 and 135, the former of which is adapted to close the port 125, and the latter the port 126. A spring 136 is secured at one of its ends to the upper portion of the pneumatic 107, and at its other end to the rear wall of the valve chest, and is employed to assist in expanding said pneumatic. The upper portion of the chest 102 is provided at its end opposite the upright 17 with a pair of tubes 137 and 138 which communicate with channels 139 formed in the end wall of the chest 102, and which channels have their lower ends open and adapted to be closed by means of a valve 140 mounted on a pivot 141 extended from the end wall of the valve chest. The valve 140 is pivotally connected at its lower portion by means of a rod 142 with the front plate 103 of the pneumatic 100 (see Figs. 2 and 9 of the drawings). The tubes 137 and 138 may have attached thereto flexible tubes leading to valves for closing off air to the player mechanism (not shown) so that the instrument will not play on the rewinding of the music sheet. Connected to the tubes 120 and 131 respectively, are branch tubes 143 and 144, each of which leads to a valve block 145 suitably supported on any part of the instrument, which valve block is provided with channels 146 with which the tubes 143 and 144 communicate at one of the ends of said channels. Valves 147 hinged to the block 145 so as to close the opposite ends of the channels 146 are normally held in their closed positions by means of springs 148 connected at one of their ends to each of said valves and at their other ends to a support 149 such as the front of the instrument casing, through which are extended the rods 150 of push buttons 151, by means of which the valves 147 can be opened so as to admit air to either or both of the tubes 120 and 131, and from thence through the tubes 119 and 130 to the valve chest on which the pneumatic for controlling the rewinding mechanism is mounted.

The operation is simple and as follows: Assuming that the parts are in the positions shown in Figs. 1 and 2 of the drawings, it will be understood that the normal or ordinary speed will be imparted to the spools and the music sheet carried thereby. Now if it is desired to advance the music sheet rapidly and so as to omit the production of one or more selections thereon, the lever 58 should be turned from the position shown in Figs. 1 and 2 to that illustrated in Fig. 10, when it is evident that the friction-roller 30 will be placed in contact with the drive-disk 31, thus causing the power to be transmitted from the shaft 32 through the shafts 25 and 72 directly to the "take-up" spool, in which case the shaft 77 and the gearing 76 and 88 thereon will occupy neutral or idle positions, as shown in Fig. 5, thus permitting the sheet to be paid off the supply spool and rapidly wound on the "take-up" spool until the proper selection is reached, at which time the lever 58 should be turned back to its normal position, shown in Figs. 1 and 2 of the drawings. To prevent the player mechanism operating or playing the selection or selections as the sheet is thus rapidly advanced, the rod 60 may have connection with a controlling valve, (not shown) similar to one of the valves 147, for shutting off air to the player mechanism, which also is not shown. After playing the aforesaid selection and it is desired to repeat a selection which has already been wound on the "take up" spool, it is apparent that by pushing the button 151 which controls the valve 147 governing the tubes 143, 119 and 120 air will be admitted to the pneumatic 100, thus causing it to be deflated or collapsed, and thereby causing the projection 104 to engage the catch 105 and to be held in its collapsed position until the desired selection is reached. As the pneumatic is collapsed, the connections 95, 96 and 98 will cause the shaft 77 and its gears to be raised from the position shown in Fig. 5 to that shown in Fig. 11, thus causing the spool 82 to reverse its movement and to rewind thereon the sheet until the desired selection shall have been reached and placed in position on the spool 82 ready for being paid off for playing. When in said positions, it will be necessary to push the button 151 which controls the valve 147 governing the tubes 144, 130 and 131, which will admit air to the pneumatic 107 and cause it to be deflated, thereby disengaging the catch 105 from the projection 104, and thus allowing the pneumatic 100 to be inflated and to permit the shaft 77 and its gears to resume their normal positions.

It will be understood that the music sheet 80, is provided as usual with the note producing perforations, as well, as, with slots or openings near each end thereof arranged to register alternately with the openings or nipples of the track-bar to which the tubes 120 and 131 are connected, in the well-known way, and that when a sufficient portion of the music sheet has been wound on the "take-up" spool to bring one of said slots of said sheet in register with the opening or nipple of the track-bar to which the tube 120 is connected, air will be admitted to the chamber 113 of the valve chest 102, thus permitting the diaphragm 114 to be shifted by the suction through the tube 109, which operation will shift the valves 117 and 118 (see Fig. 7), so as to close the port 111 and open the port 110, thus allowing air to be exhausted from the pneumatic 100 through the tube 109 and causing said pneumatic to be collapsed, and thereby causing the projection 104 to engage the catch 105 and to be held in its collapsed position. As the pneumatic is collapsed the connections 95, 96 and 98 will cause the shaft 77 and its gears to be raised from the position shown in Fig. 5 to that shown in Fig. 11, thus causing the spool 82 to reverse its movement and to rewind thereon the sheet until a sufficient quantity of the same has been wound on the spool 82 and unwound from the take-up spool to permit another of the slots of the music sheet to register with the opening or nipple of the tracker-bar to which the tube 131 is connected, when it is apparent air will be admitted to the chamber 129 (see Fig. 8), thus permitting the diaphragm 128 to be shifted by the continuous suction through the tube 109, which operation will shift the valves 134 and 135 so as to close the port 123 and open the port 125, thus allowing air to be exhausted from the pneumatic 107 through the tube 109 and cause said pneumatic to be deflated, thereby disengaging the catch 105 from the projection 104, and thus allowing the pneumatic 100 to be inflated and to permit the shaft 77 and its gears to resume their normal positions.

Having thus fully described our invention what we claim as new and desire to secure by Letters Patent is—

1. In a mechanism of the class described, the combination with a main or supporting frame, of a pair of spools journaled at one end thereof, a train of gears mounted on and between the journals of the spools, a pair of the said intermediate gears being movably journaled, a driven friction disk, power transmitting means uniting said disk and said movable gears, and automatic means for shifting the position of the movably mounted gears from the gearing on the journal of one of the spools to the gearing of the journal of the other spool.

2. In a mechanism of the class described, the combination with a main or supporting frame, of a pair of spools journaled at one end thereof, a train of gears mounted on and between the journals of the spools, a pair of the said intermediate gears being movably journaled, a driven friction disk, power transmitting means uniting said disk and said movable gears, and manually operated means for shifting the position of the movably mounted gears from the gearing on the journal of one of the spools to an idle position.

3. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a driven friction disk, power transmitting means uniting said disk and said movable bars, and means connecting the pneumatic and said transmission means for shifting the movably mounted gears by the deflation and inflation of the pneumatic.

4. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a branch tube connected to each of the said tubes, means to open and close said branch tubes, a driven friction disk, power transmitting means uniting said disk and said movable bars, and means connecting the pneumatic and said transmission means for shifting the movably mounted gears by the deflation and inflation of the pneumatic.

5. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a driven friction disk, power transmitting means uniting said disk and said movable gears, means connecting the pneumatic and said transmission means for shifting the movably mounted gears by the deflation of the pneumatic, and means for holding said pneumatic in its deflated position and said movable gears in their shifted position.

6. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a driven friction disk, power transmitting means uniting said disk and said movable gears, means connecting the pneumatic and said transmission means for shifting the movably mounted gears by the deflation of the pneumatic, means for holding said pneumatic in its deflated position and said movable gears in their shifted position, and means to release the pneumatic, to inflate the same and to return the movable gears to their original positions.

7. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a branch tube connected to each of said tubes, a valve to open and close each of the branch tubes, a driven friction disk, power transmitting means uniting said disk and said movable gears, means connecting the pneumatic and said transmission means for shifting the movably mounted gears by the deflation of the pneumatic, and means for holding said pneumatic in its deflated position and said movable gears in their shifted position.

8. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of music sheet, a branch tube connected to each of said tubes, a valve to open and close each of the branch tubes, a driven friction disk, power transmitting means uniting said disk and said movable gears, means connecting the pneumatic and said transmission means for shifting the movably mounted gears by the deflation of the pneumatic, means for holding said pneumatic in its deflated position and said movable gears in their shifted position, and means to release the pneumatic, to inflate the same and to return the movable gears to their original positions.

9. In a mechanism of the class described, the combination with a main or supporting frame, of a pair of spools journaled at one end thereof, a tracker-bar mounted between the spools, a perforated music sheet connected at its ends to said spools and extended over said bar and provided near each of its ends with an opening for controlling a pneumatic, a train of gears mounted on and between the journals of the spools, a pair of the said intermediate gears being movably mounted, a pneumatic mounted near said train of gears, a pair of tubes communicating at one of their ends with the pneumatic and at their other ends with certain openings of the tracker-bar arranged to register with the said openings of the music sheet, a driven friction disk, power transmitting means uniting said disk and said movable gears, means to vary the speed of certain gears of the train of gears, and means connecting the pneumatic and said transmission means for shifting the movably mounted gears by the deflation and inflation of the pneumatic.

10. In a mechanism of the class described, the combination with a main or supporting frame, of a pair of spools journaled thereon, a train of gears mounted on and between the journals of the spools, a pair of the said intermediate gears being movably journaled, a driven friction disk, a movably mounted and jointed shaft extended from near said disk and connected to the journal of the intermediate gears, a friction roller slidable on said shaft, and engaging the disk, and means to reciprocate said roller.

11. In a mechanism of the class described, the combination with a supporting frame, of a pair of gears journaled thereon, but not in engagement with one another, a shaft movably journaled and extended between said gears, means on the interposed portion of said shaft to engage said gears alternately, a driven friction disk near said shaft, a friction roller slidably mounted on the shaft in engagement with the disk, means to slide said roller back and forth, and pneumatically operated means to disconnect the engaging means on said shaft from one of said gears.

12. In a mechanism of the class described, the combination with a main supporting frame, of a pair of gears journaled thereon but not in engagement with one another, a spring actuated rock shaft mounted on the frame, a pair of arms extended from said rock shaft, a jointed shaft journaled on said arms and extended between said gears, means on the interposed portion of said shaft to engage said gears alternately, a driven friction roller journaled near said rock shaft, a friction roller slidably mounted on the jointed shaft between said arms and in engagement with the disk, means to slide said roller back and forth, and pneumatically operated means to disconnect the engaging means on the jointed shaft from one of said gears.

13. In a mechanism of the class described, the combination with a main supporting frame having at each of its ends an upright, an auxiliary frame mounted near one of said uprights and having a bracket extended upwardly from its middle lower portion, a driven friction disk journaled near the auxiliary frame, a shaft horizontally journaled on the lower portion of the last named frame, a beveled gear on one end of said shaft, and a gear near the other end of said shaft, another shaft horizontally and movably journaled above the first named shaft, a friction roller engaging a friction disk and slidably mounted on the last named shaft, a gear mounted above the gear on the first named shaft, and means on the second named shaft to engage said gears alternately, a bracket pivotally and vertically mounted on the auxiliary frame, a shaft vertically journaled on said bracket, a beveled gear on said shaft to engage the first named beveled gear, a friction roller on the vertical shaft, means to move said friction roller into and out of contact with the friction disk, and means to reciprocate the first named friction roller.

14. In a mechanism of the class described, the combination with an upright frame, of a driven friction disk journaled thereon, a bracket vertically and pivotally mounted on said frame, a shaft vertically journaled on said bracket, a friction roller on said shaft, means for the transmission of power from said shaft, and means to move the friction roller on said shaft into and out of contact with the friction disk.

15. In a mechanism of the class described, the combination with an upright frame, of a friction disk journaled in a vertical plane thereon, means to drive said disk, a vertically disposed bracket pivotally mounted on said frame, a shaft vertically mounted on said bracket, a friction roller carried by said shaft and adapted to engage the disk, means on said shaft to transmit power to another shaft, another vertical shaft journaled near the first named vertical shaft and having a crank at its upper and lower portions, a link pivotally connecting the upper crank on said shaft and the upper portion of said bracket, a suitably fulcrumed lever, and a connection uniting said lever and the lower crank of the last named shaft whereby the vertical roller may be thrown into and out of contact with the friction disk.

16. In a mechanism of the class described, the combination with a frame, of a friction disk journaled thereon, a shaft tiltingly journaled in parallelism with the face of said friction disk, a friction roller mounted on said shaft, means on said shaft to transmit power therefrom to another shaft, a jointed connection pivotally secured at one of its ends to a support and at its other end to a movable part, a shaft journaled near said jointed connection and having at one of its ends a crank arm adapted to contact therewith and at its other end another crank arm, means connecting the last named arm and the shaft of the friction roller for the purpose of moving said roller into and out of contact with the friction disk and for moving the jointed connection for the purpose of raising the movable part to which it is connected.

17. In a mechanism of the class described, the combination with a pneumatic, of a pair of tubes mounted thereon and leading therefrom, a valve pivotally mounted on said pneumatic, and a link pivotally connected at one of its ends to the valve and at its other end to the movable plate of the penumatic whereby said valve will be moved to open and close said tubes.

OSCAR NELSON.
PEDER WIGGEN.

Witnesses:
CHAS. C. TILLMAN,
A. S. PHILLIPS.

Copies of this patent may be obtained for five cents each, by addressing the "Commissioner of Patents, Washington, D. C."